US 7,454,746 B2
Nov. 18, 2008

(12) United States Patent
Micco et al.

(54) FUNCTION CALL TRANSLATION

(75) Inventors: John T. Micco, Waltham, MA (US);
William M. McKeeman, Hollis, NH (US); Brett Baker, Framingham, MA (US); Michael Karr, Brookline, MA (US)

(73) Assignee: The MathWorks, Inc., Natick, MA (US)

( * ) Notice: Subject to any disclaimer, the term of this patent is extended or adjusted under 35 U.S.C. 154(b) by 520 days.

This patent is subject to a terminal disclaimer.

(21) Appl. No.: 09/911,819

(22) Filed: Jul. 24, 2001

(65) Prior Publication Data

US 2003/0056203 A1 Mar. 20, 2003

(51) Int. Cl.
*G06F 9/45* (2006.01)
(52) U.S. Cl. ..................................... 717/137
(58) Field of Classification Search ......... 717/104–105, 717/114, 110, 121, 146, 100, 140, 137; 709/246, 709/332; 716/3, 18; 719/330, 328, 316
See application file for complete search history.

(56) References Cited

U.S. PATENT DOCUMENTS

| 5,732,270 | A | * | 3/1998 | Foody et al. | 719/316 |
| 5,799,192 | A | * | 8/1998 | Yasuda | 717/100 |
| 5,842,220 | A | * | 11/1998 | De Groot et al. | 707/103 R |
| 6,151,638 | A | * | 11/2000 | Hale et al. | 719/312 |
| 6,243,856 | B1 | * | 6/2001 | Meyer et al. | 717/146 |
| 6,446,137 | B1 | * | 9/2002 | Vasudevan et al. | 719/330 |
| 6,691,301 | B2 | * | 2/2004 | Bowen | 717/114 |
| 7,150,010 | B1 | * | 12/2006 | Ringseth et al. | 717/140 |
| 2001/0037417 | A1 | * | 11/2001 | Meyer | 709/332 |
| 2004/0015898 | A1 | * | 1/2004 | Tewksbary | 717/140 |
| 2004/0243974 | A1 | * | 12/2004 | Gardas et al. | 717/106 |

OTHER PUBLICATIONS

Shannon et al., "Mapping the Interface Description Language Type Model in C", Nov. 1989, IEEE Transactions on Software Engineering, vol. 15, No. 11, p. 1333-1346.*
Research Systems, "IDL", copyright 1994, URL "http://www.ccpo.odu.edu/ug/sw/idl_sw.html".*
Elmroth et al., "A Web Computing Environment for the SLICOT Library", Dec. 2000, Brite-Euram III, Networks Programme NICONET.*

(Continued)

*Primary Examiner*—Tuan Anh Vu
(74) *Attorney, Agent, or Firm*—Lahive & Cockfield, LLP; Kevin J. Canning

(57) ABSTRACT

Methods and apparatus for using description information about a function to translate a call to the function in a first language into a call to a corresponding function in a second language. The methods include create description information from a definition of a function associated with a first language that enables translation of a call to the function in the first language into a call to a corresponding function in a second language without requiring processing of the definition of the function. In one aspect, the methods include providing a description file of items, each item including description information about a function associated with a first language, and using the file of description items to translate a first program file from the first language into a second language.

25 Claims, 3 Drawing Sheets

OTHER PUBLICATIONS

Welling et al., "Customizing IDL mappings and ORB Protocols", 2000, IFIP/ACM International Conference on Distributed systems platforms, pp. 396-414.*

Bjarne Stroustrup, "the C++ Programming Language", 2nd Edition, copyright 1991, ch. 3.1.6; r.3.4; r.8.2.5; r.3.3.1.*

* cited by examiner

FUNCTION CALL TRANSLATION

TECHNICAL FIELD

This invention relates to function call translation.

BACKGROUND

Function call translation is one aspect of translating a program from one programming language (called the "source language") to another programming language (called the "target language"). In program translation, each function call in the source language program is translated into a function call in the target language.

One way to perform the translation is to include a header file at the head of a source language program by use of a preprocessor directive. For example, a header file included at the head of a C program file can be used by a translator to translate the program file from C to Java. If the header file contains information defining a one-to-one mapping between C-functions and Java-functions, when a C-function call in the source language program needs to be translated from C to Java, the translator uses the mapping information in the header file to generate the appropriate Java-function call. For example, the header file may contain a mapping from the C-function foo to the Java-function foo that indicates the correct calling sequence for the C-function to use when calling the Java-function. Then, if the source program file contains a call to the C-function foo, say "foo(3, &a)", the translator will convert the call to "foo(3, a)".

Another approach allows for a one-to-many correspondence between source language functions and target language functions. A call to one of the source language functions is translated by processing the source language function as it is called, deriving information about the source language function on the fly, and using the derived information to generate a target language call to the function. For example, if a source language program written in the MATLAB programming language (available as product model MATLAB 6 (Release 12) from The MathWorks, Inc.) contains multiple MATLAB-function calls to a function f2, each time a call to the function f2 needs to be translated from MATLAB to C, the translator processes the source language code for function f2 to derive all the information (e.g., the declared number of formal inputs and outputs to function f2, the scope of function f2, the use of certain language features, such as variable argument lists or the nargout function) needed to generate a C-function call to the function f2.

SUMMARY

In general, in one aspect, the invention provides a method and apparatus, including a computer program apparatus, implementing techniques for processing a definition of a function associated with a first language to create description information about the function, the description information being sufficient to enable translation of a call to the function into a call to a corresponding function in a second language without requiring processing of the definition of the function.

The description information may be stored in a file of description items. The definition of the function may be processed by examining the definition of the function associated with the first language; deriving information about the function; and using the derived information to translate the call to the function into a call to a corresponding function in the second language. The derived information may be used to create the description information. The translated function in the second language may be stored in a library of entries. The definition of the function may be processed by deriving a number of declared formal inputs to the function; deriving a number of declared formal outputs to the function; deriving a scope of the function; determining whether the function accepts a variable number of arguments; and determining whether the function returns a variable number of results.

In general, in another aspect, the invention provides a method and apparatus, including a computer program apparatus, implementing techniques for providing a file of description items, and using the file of description items to translate a first program file into a second program file. Each item may include description information about a function associated with a first language, the description information being sufficient to enable translation of a call to the function into a call to a corresponding function in a second language without requiring processing of the definition of the function.

The description information about the function may include a descriptor identifying a declared number of formal inputs to the function; a descriptor identifying a declared number of formal outputs to the function; a descriptor identifying a scope of the function; a descriptor identifying an acceptance of a variable input argument list into the function; and a descriptor identifying a return of a variable output argument list from the function.

The techniques for using the file of description items may include retrieving an item from the file of description items for each call to a function in the first program file; using the description information in the item to translate the call to the function in the first language into a call to a corresponding function in the second language; and storing the translated function in the second program file. A call may be generated through a function evaluation interface for the function if the description information includes a descriptor identifying an acceptance of a variable input argument list into the function, or a descriptor identifying a return of a variable output argument list from the function. A call may be generated through a normal interface for the function if the description information includes a descriptor identifying a known number of input and output arguments to the function.

In general, in another aspect, the invention provides a method and apparatus, including a computer program apparatus, implementing techniques for providing a library file; processing the library file to create a function library and a description file; and using the description file to translate a program file from the first language into the second language.

The library file may include functions defined by a first language. The function library may include one or more functions defined by a second language, each function in the function library being a translated version of a function in the library file. The description file may include description information about each function in the library file, the description information being sufficient to enable translation of a call to the function into a call to a corresponding function in the second language without requiring processing of the definition of the function. Each call in the program file to a function in the library file may be translated into a call to a corresponding function in the second language by examining the definition of each function in the library file; deriving information about each function; and using the derived information to translate the call to each function into a call to a corresponding function in the second language.

Advantages of the invention may include one or more of the following. The library description file contains all the relevant information required to generate target language calls to the functions in the target language library without requiring the source language code for the functions within the target language library to be available to the translator. Using the information in the library description file to generate a target language call to a function in the target language library is faster than deriving the required information each time the function is called.

Other features and advantages of the invention will be apparent from the description and from the claims.

DETAILED DESCRIPTION

Figure 1:
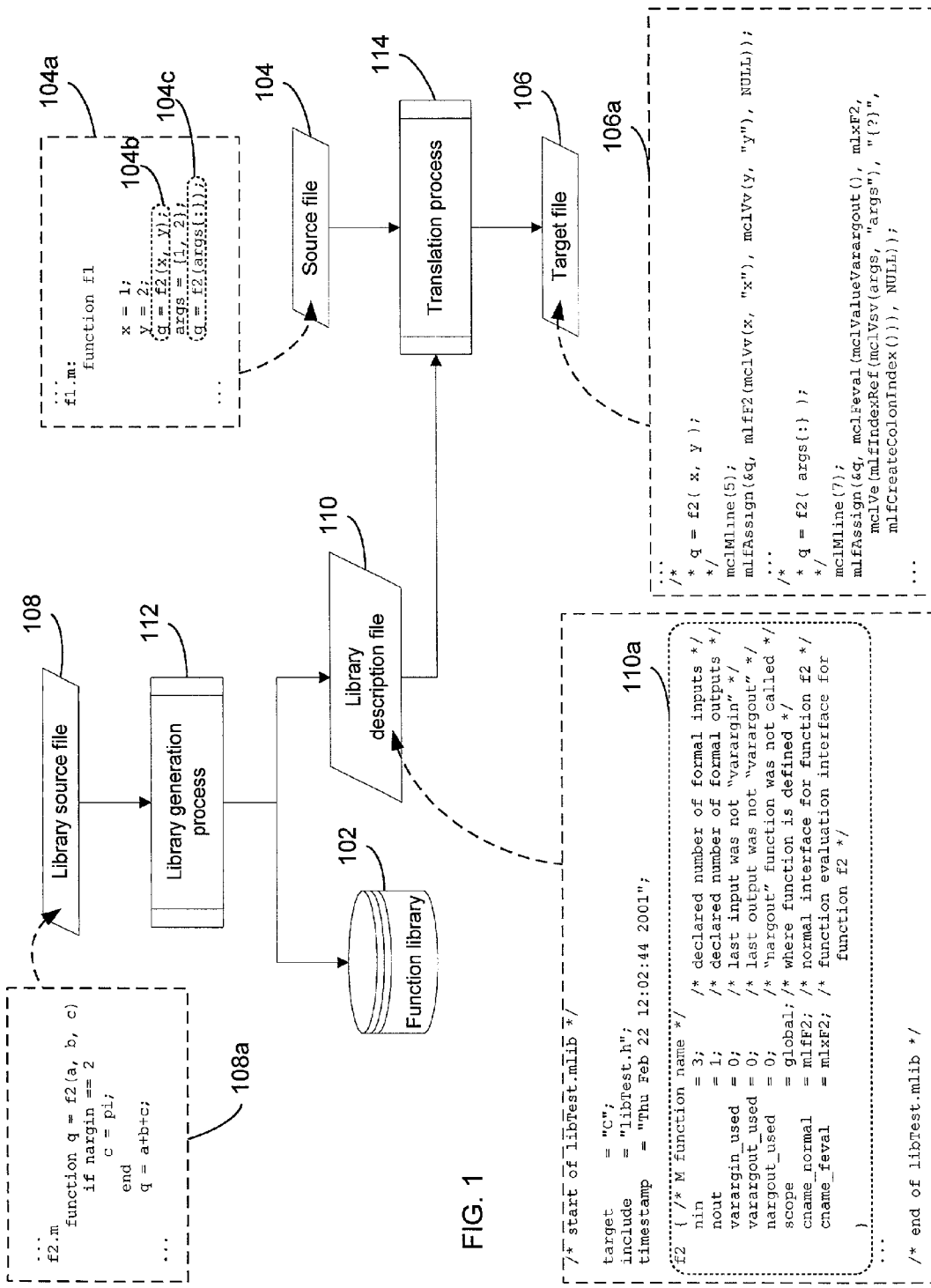
FIGS. 1, 2 and 3 are flowcharts of function call translation processes.

FIG. 1 shows a process implemented in a computer program application for creating a library description file 110, and using the library description file 110 to translate a source file 104 into a target file 106.

Generally, the term "source code" refers to program instructions written in a particular programming language. The word "source" differentiates the code from other forms, for example, object code and executable code. The term "source code" refers to program instructions in either a source language or a target language. The term "source language code" will refer to source code in the source language and the term "target language code" will refer to source code in the target language.

A library description file 110 is a file that includes descriptions of functions that form part of the source language. The library description file 110 is built incrementally as a library generation process 112 processes functions defined by a source language (called "source language functions") in one or more library source files 108 to create a target language function library 102. The library description file 110 can be stored in any data format, such as ASCII. In the example shown in FIG. 1, the library description file 110 includes information 110a about a source language function f2. The description information 110a includes the number of declared formal inputs and outputs to function f2, the scope of function f2, and all other information about function f2 required to translate a source language call to function f2 into a target language call to a corresponding function.

A library source file 108 can be a stand-alone file, or one of multiple library source files associated with the function library 102. Each library source file 108 includes source language code that defines one or more functions. In the example shown in FIG. 1, the library source file 108 includes source language code 108a that defines multiple source language functions, one of which is source language function f2. The functions in the library source file 108 may call other functions that are defined by source language code located in the library source file 108 being processed, or in one of the multiple library source files associated with the function library 102.

Figure 2:
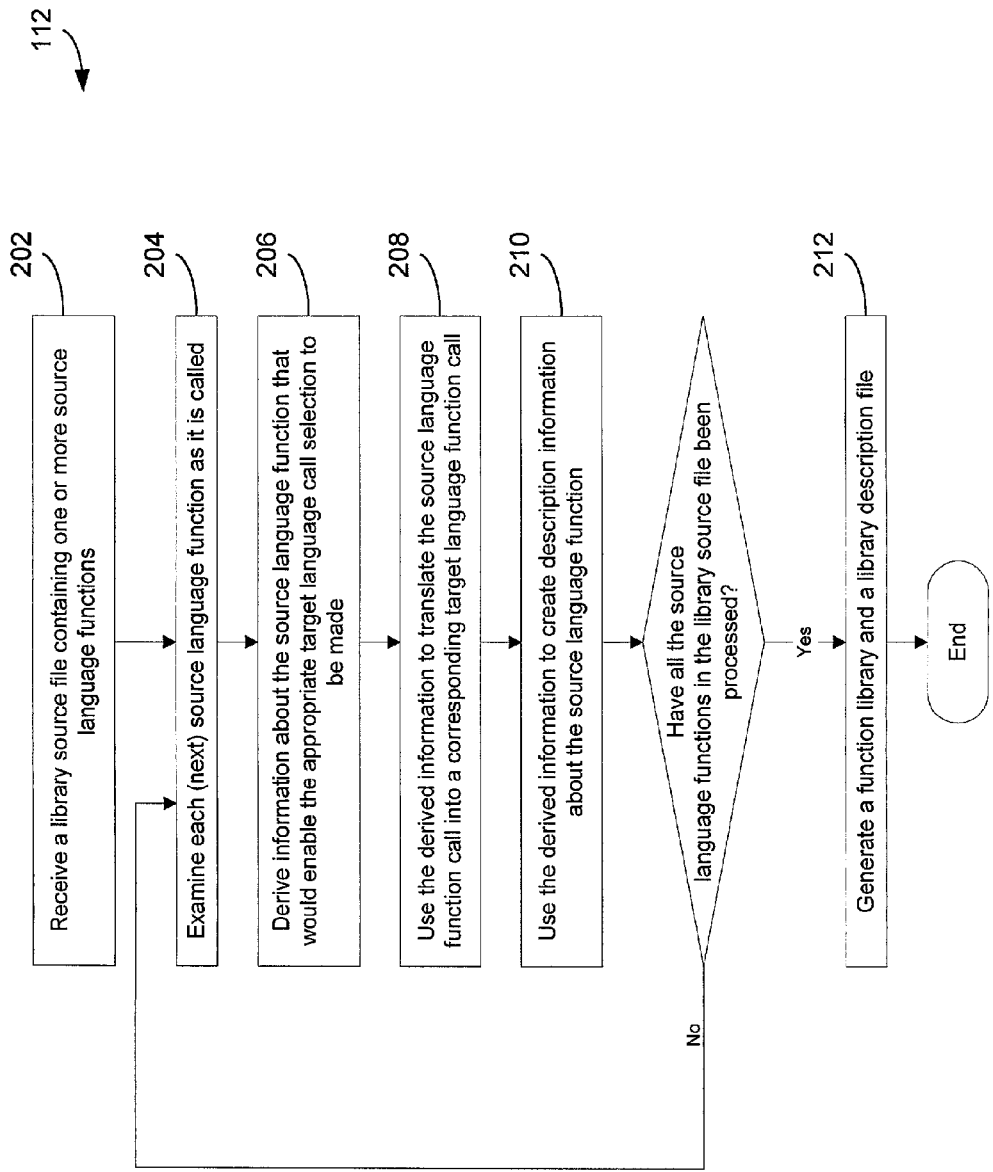

Referring to FIGS. 1 and 2, the library generation process 112 receives a library source file 108 including source language code 108a defining one or more source language functions in step 202. The library generation process 112 processes each source language function in the library source file 108 by: (1) examining the source language function as it is called (step 204); (2) deriving information about the source language function that would enable the appropriate target language function call selection to be made (step 206); and (3) using the derived information to translate the source language function call into a corresponding target language function call (step 208). The library generation process 112 also uses the derived information to create description information 110a about the source language function (step 210). In one example of how to create the description information 110, the library generation process 112 examines the source language code 108a for the function f2:

```
function q = f2(a, b, c)
    if nargin == 2
        c = pi;
    end
    q = a+b+c;
``` derives all the information (e.g., the declared number of formal inputs and outputs to function f2, the scope of function f2, the use of certain language features, such as variable argument lists or the nargout function) that the translation process 114 needs to understand what the function f2 means, and generates the following description information for function f2:

```
f2 { /* M function name */
    nin = 3;                      /* declared number of formal inputs */
    nout = 1;                     /* declared number of formal outputs */
    varargin__used = 0;           /* last input was not "varargin" */
    varargout__used = 0;          /* last output was not "varargout" */
    nargout__used = 0;            /* "nargout" function was not called */
    scope = global;               /* where function is defined */
    cname__normal = mlfF2;        /* normal interface for function f2 */
    cname__feval = mlxF2;         /* function evaluation interface for
                                      function f2 */
}
``` where the "nargout" function is used to specify the number of output arguments for function f2, the normal interface mlfF2 for function f2 is used when the number of actual input and output arguments for function f2 is known at translation-time, and the function evaluation interface mlxF2 for function f2 is used when the number of input and output arguments for function f2 is not computable at translation-time, for example, when using cell-list expansion.

The library generation process 112 is repeated at step 202 until description information 110a for all of the source language functions in the library source file 108 has been created. Once this occurs, the library generation process 112 generates a function library 102 containing translated versions of the source language functions in the library source file 108 and a library description file 110 (step 212), and the library generation process 112 is terminated.

The application then uses the library description file 110 to translate a source file 104 into a target file 106 without requiring the source language code found in the library source file 108 for the functions in the function library 102 to be available. For example, as shown in FIG. 1, the source file 104 contains source language code 104a for a program that has a function f1 that calls a function f2 twice: with two arguments directly f2(x, y) 104b, and with a number of arguments not known at translation-time f2(args {:}) 104c. For each call 104b and 104c to the source language function f2 in the source file 104, the translation process 114 retrieves the description information 110a for function f2 from the library description file 110, and uses the information to generate a call to a corresponding function in the target language without requiring the source language code 108a for the function f2 to be available. In one implementation, the translation process 114 uses the following software algorithm to generate the translated function calls using the description information 110a in the library description file 110:

```
Inputs to the translation process:

integer nin                    = Declared number of formal inputs
    integer nout                   = Declared number of formal outputs
    bool varargin_used             = Was the last input "varargin"
    bool varargout_used            = Was the last output "varargout"
    bool nargout_used              = Was the "nargout" function called
    integer number_of_inputs       = Number of actual inputs
    term rhs [number_of_inputs]    = Actual formal input expressions
    integer number_of_outputs      = Actual number of outputs requested
    term lhs [number_of_outputs]   = Actual lhs expressions
Outputs of the translation process:

term t = The function call term after translation
if !varargout_used && number_of_outputs > nout
    Error( "Too many outputs" );
end
if !varargin_used && number_of_inputs > nin
    Error( "Too many inputs" );
end
if any input argument to the function produced an unknown number of formals
(prior to the varargin argument)
    OR there is an unknown number of output arguments prior to the
varargout argument
    Produce a call through feval to the mlx version of the function
        The arguments to mclFeval are:
            if number_of_outputs == 0
                add a call to "mclAnsVarargout()";
            else if number_of_outputs == 1
                add a call to "mclValueVarargout()";
            else if number_of_outputs > 1
                add a call to "mclNVarargout( "number_of_outputs " , "
varargout_used ", "lhs [. . .] ");"
            end
        add a reference to the mix version of the function
        add all of the rhs[] argument term expressions
else
    Produce a call directly to the mlf version of the function
        The arguments to the mlf function are:
            add each of the lhs arguments except the first output argument
            add a NULL for each unused input argument
            add each of the rhs arguments
            if varargin_used and number_of_inputs >= nin
                add any trailing arguments into varargin using mlfVarargin
            else
                add NULL arguments for each unspecified formal input argument.
            end
end
```

The C-function call—that is, the translated version of MATLAB—function call f2(x,y) 104b—generated by the translation process 114 using the normal interface mlfF2 for the function is:

mlfAssign(&q, mlfF2(mclVv(x, "x"), mclVv(y, "y"), NULL));

and the translated version of MATLAB-function call f2(args {:}) 104c generated by the translation process 114 using the function evaluation interface mlxF2 for the function is:

mlfAssign (&q, mclFeval(mclValueVarargout (), mlxF2, mclVe(mlfIndexRef(mclVsv(args, "args"), "{ ?}", mlfCreateColonIndex())), NULL));

as shown in FIG. 1. Once all of the calls in the source file 104 have been translated, the target file 106 is produced and the translation process 114 is terminated.

In one implementation, the source language is the MATLAB programming language and the target language is the C programming language. The translation process 114 is not limited to translating files from the MATLAB programming language into the C programming language. Any combination of programming languages—e.g., MATLAB and C, MATLAB and C++, MATLAB and FORTRAN—subject to the following four conditions can be used:

(1) Translation of a call to a function defined by the source language into a call to a corresponding function defined by the target language results in a one-to-many correspondence between the source language functions and the target language functions. For example, in the MATLAB programming environment, the single MATLAB-function f2 maps to two functions in the C programming language, namely mlfF2 and mlxF2.

(2) A selection of one of the available target language functions has to be made based on information (e.g., the number of declared formal inputs and outputs to the function, the use of certain language features, such as variable argument lists or the nargout function) about the source language function being invoked, and the context of the call to that source language function. If, for example, the translation process 114 receives a source file containing a MATLAB-function call to function f2 as follows:

$$q=f2(3);$$

the translation process 114 would retrieve the description information 110a for function f2 from the library description file 110, examine the description information 110a, and call the C-function mlfF2 (instead of the C-function mlxF2) because the number of input arguments is known at translation-time. On the other hand, if the translation process 114 receives a source file containing a MATLAB-function call to function f2 as follows:

$$[q\{:\}]=f2(x,y,z);$$

the translation process 114 would retrieve the description information 110a for function f2 from the library description file 110, examine the description information 110a, and call the C-function mlxF2 because the number of output arguments is not computable at translation-time.

(3) The information about the target language function required for determining which target language function to call cannot be derived solely from the target language function definitions. For example, in the MATLAB programming environment, the mlf( ) and mlx( ) functions do not contain all of the mapping information required to make the appropriate call selection. Without the function library, a translator would have to process the source language code for the function from the library source file 108 each time the function is called to obtain the information necessary to make the correct translation.

Figure 3:
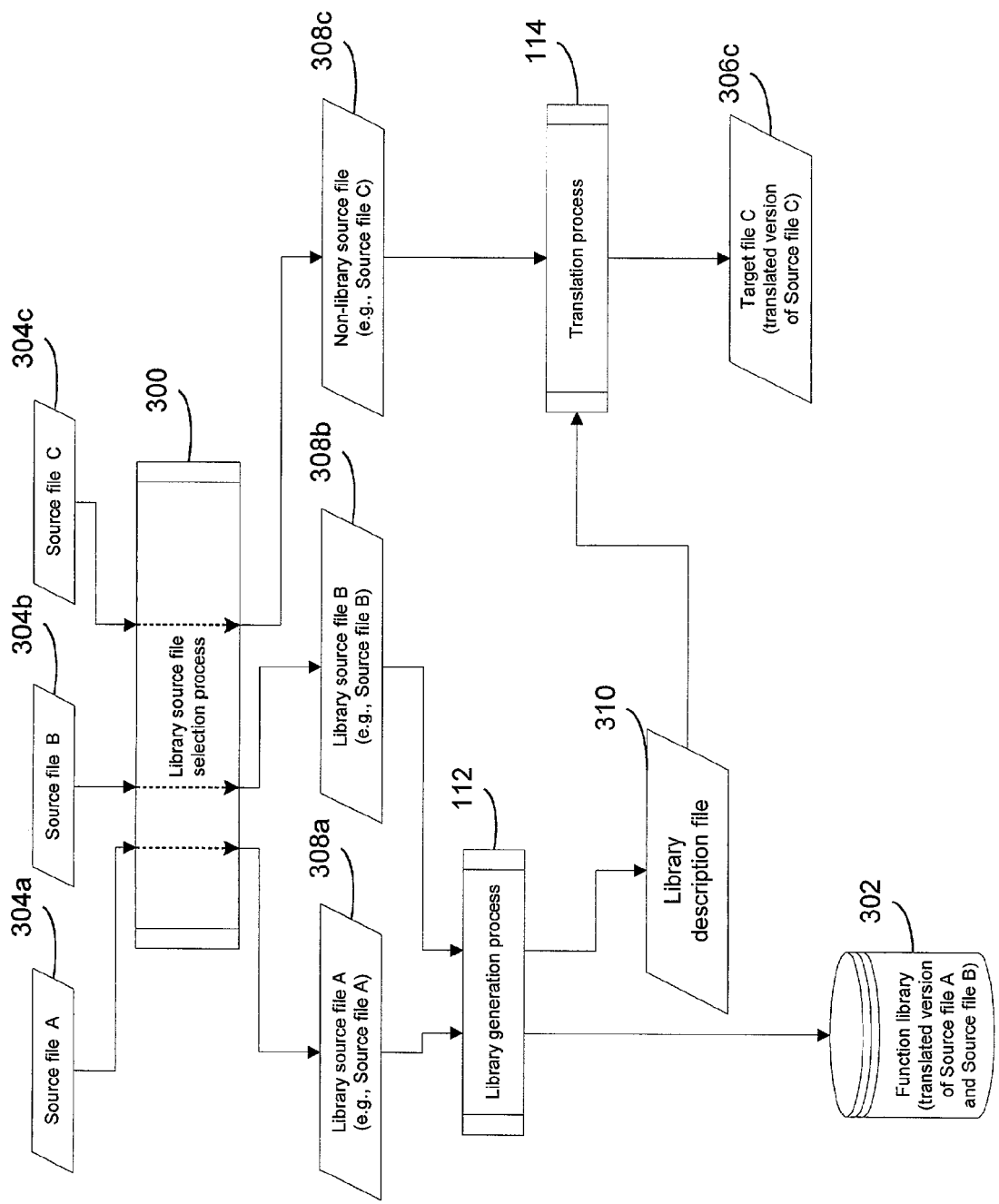

(4) The list of arguments passed to the target language function is determined based on information about the function being invoked and the target language function selected. In the example shown above, the application knows from the information in the description file for function f2 that it has to pass three arguments, not just one, to the function in order to call the C function as defined. In one example of how to pass additional arguments, the translation process 114 adds additional arguments (in the form of NULL arguments) in order to call the C function as defined. The result of the function call translation of f2(3) from MATLAB to C would be:

mlfF2(mlfScalar(3.0), NULL, NULL);

In one implementation, the application includes a library source file selection process 300 that allows a user to designate which of the available source files 304a, 304b and 304c is to be used to generate the function library 302, as shown in FIG. 3. Assume, for example, that the application receives an input from a user selecting the source file A 304a and the source file B 304b as library source files 308a and 308b. The application provides the library source files 308a (containing the source language code in source file A 304a) and 308b (containing the source language code in source file B 304b) to a library generation process 112. The library generation process 112 processes the source language functions in the library source files 304a and 304b to create a function library 302 and a library description file 310, much in the same manner as was described in reference to FIGS. 1 and 2. The translation process 112 then uses the library description file 310 to translate the non-library source file 308c (that is, the source file that was not designated by the user as a library source file) into a target file 306c, without requiring the source language code of the functions in the function library 302 to be available.

Other embodiments are within the scope of the following claims.

What is claimed is:

1. In a computing device, a method comprising:
   providing a first function in a first programming language in a library file;
   deriving a definition of the first function;
   creating description information about the first function using the definition of the first function;
   translating the first function in the first programming language into a corresponding function in a second programming language using the definition of the first function;
   generating a function library containing the corresponding function in the second programming language;
   creating description file from the library file, the description file including the description information about the first function in the library file, the description information enabling translation of a call to the first function in the first programming language into a call to a corresponding function in the second programming language while avoiding accessing the first function in the first programming language for the translation;
   storing the function library and the description file;
   translating a first file in the first programming language to a corresponding file in the second programming language, the first file comprising one or more calls to the first function, the translating comprising:
      accessing the description information about the first function for each of the one or more calls to the first function;
      using the description information to create each of the one more calls to the corresponding function in the second programming language while avoiding accessing the first function; and
      including the corresponding function in the second programming language from the function library as part of the corresponding file in the second programming language.

2. The method of claim 1, wherein creating description information about the first function comprises: examining the definition of the first function associated with the first programming language; and deriving information about the first function.

3. The method of claim 1, in which creating description information about the first function comprises: deriving a number of declared formal inputs to the first function.

4. The method of claim 1, in which creating description information about the first function comprises: deriving a number of declared formal outputs to the first function.

5. The method of claim 1, in which creating description information about the first function comprises: deriving a scope of the first function.

6. The method of claim 1, in which creating description information about the first function comprises: determining whether the first function accepts a variable number of arguments.

7. The method of claim 1, in creating description information about the first function comprises: determining whether the first function returns a variable number of results.

8. In a computing device, a method comprising:
   providing a library file including functions defined by a first programming language;
   creating a function library, the function library including one or more functions defined by a second programming language, each function in the function library being a translated version of a function in the library file;

creating a description file from the library file, the description file including description information about each function in the library file, the description information enabling translation of a call to the function in the first programming language into a call to a corresponding function in the second programming language while avoiding accessing the function in the first programming language for each translation;

storing the function library and the description file; and translating a program file from the first programming language into the second programming language using the description file and the function library to produce a translated file, the program file in the first programming language comprising one or more calls to a selected function among the functions in the library file, the translating comprising:

retrieving the description information for the selected function from the library file, examining the description information for the selected function to determine a corresponding function in the second programming language that is in the function library, translating each call to the selected function in the first programming language into a call to the corresponding function in the second programming language in the translated file; and including the corresponding function in the second programming language from the function library as part of the translated file.

9. The method of claim 8, wherein creating a description file comprises:

examining the definition of each function in the library file; and deriving information about each function.

10. The method of claim 8, wherein translating each call comprises: generating a call through a function evaluation interface for the selected function if the description information includes a descriptor identifying an acceptance of a variable input argument list into the selected function.

11. The method of claim 8, wherein translating each call comprises: generating a call through a function evaluation interface for the selected function if the description information includes a descriptor identifying a return of a variable output argument list from the selected function.

12. The method of claim 8, wherein translating each call comprises: generating a call through a normal interface for the selected function if the description information includes a descriptor identifying a known number of input and output arguments to the selected function.

13. A computer program product, tangibly stored on a computer-readable medium, for creating a data file, the product comprising instructions operable to cause a programmable processor to:

obtain a first function in a first programming language in a library file;

derive a definition of the first function;

create description information about the first function using the definition of the first function;

translate the first function in the first programming language into a corresponding function in a second programming language using the definition of the first function;

generate a function library containing the corresponding function in the second programming language;

create a description file from the library file, the description including the description information about the first function in the library file, the description information enabling translation of a call to the first function in the first programming language into a call to a corresponding function in the second programming language while avoiding accessing the first function in the first programming language for the translation;

store the function library and file description;

translate a first file in the first programming language to a corresponding file in the second programming language, the first file comprising one or more calls to the first function, said translating causing the processor to:

access the description information about the first function for each of the one or more calls to the first function;

use the description information to create a call to the corresponding function in the second programming language while avoiding accessing the first function; and include the corresponding function in the second programming language from the function library as part of the corresponding file in the second programming language.

14. The product of claim 13, wherein creating description information comprises: examining the definition of the first function associated with the first programming language; and deriving information about the first function.

15. The product of claim 14, further comprising instructions operable to cause a programmable processor to: use the derived information to create the description information.

16. The product of claim 13, in which creating description information comprises: deriving a number of declared formal inputs to the first function.

17. The product of claim 13, in which creating description information comprises: deriving a number of declared formal outputs to the first function.

18. The product of claim 13, in which creating description information comprises: deriving a scope of the first function.

19. The product of claim 13, in which creating description information comprises: determining whether the first function accepts a variable number of arguments.

20. The product of claim 13, in which creating description information comprises: determining whether the first function returns a variable number of results.

21. A computer program product, tangibly stored on a computer-readable medium, for translating function calls, the product comprising instructions operable to cause a programmable processor to:

provide a library file including functions defined by a first programming language;

create a function library, the function library including one or more functions defined by a second programming language, each function in the function library being a translated version of a function in the library file;

create the description file from the library file, the description file including description information about each function in the library file, the description information enabling translation of a call to the function in the first programming language into a call to a corresponding function in the second programming language in a manner that avoids accessing the function in the first programming language for each translation;

store the function library and the description file in a storage; and translate a program file from the first programming language into the second programming language using the description file and the function library to produce a translated file, the program file in the first programming language comprising one or more calls to a selected function among the functions in the library file, the translating causing the processor to:
- retrieve the description information for the selected function from the library file,
- examine the description information for the selected function to determine a corresponding function in the second programming language that is in the function library,
- translate each call to the selected function in the first programming language into a call to the corresponding function in the second programming language in the translated file; and
- including the corresponding function in the second programming language from the function library as part of the translated file.

22. The product of claim 21, wherein creating a description file comprises: examining the definition of each function in the library file; and deriving information about each function.

23. The product of claim 21, wherein the instructions operable to cause a programmable processor to translate the program further comprise: instructions to cause the programmable processor to generate a call through a function evaluation interface for the selected function if the description information includes a descriptor identifying an acceptance of a variable input argument list into the selected function.

24. The product of claim 21, wherein the instructions operable to cause the programmable processor to translate the program further comprise: instructions to cause the programmable processor to generate a call through a function evaluation interface for the selected function if the description information includes a descriptor identifying a return of a variable output argument list from the selected function.

25. The product of claim 21, wherein the instructions operable to cause the programmable processor to translate the program further comprise: instructions to cause the programmable processor to generate a call through a normal interface for the selected function if the description information includes a descriptor identifying a known number of input and output arguments to the selected function.

* * * * *

UNITED STATES PATENT AND TRADEMARK OFFICE
CERTIFICATE OF CORRECTION

| | | |
|---|---|---|
| PATENT NO. | : 7,454,746 B2 | |
| APPLICATION NO. | : 09/911819 | |
| DATED | : November 18, 2008 | |
| INVENTOR(S) | : John Micco et al. | |

It is certified that error appears in the above-identified patent and that said Letters Patent is hereby corrected as shown below:

In Claim 1, Column 8, Line 33, please add --or-- after the word "one".

In Claim 13, Column 10, Line 6, please add --the-- after the word "and".

Signed and Sealed this

Tenth Day of February, 2009

JOHN DOLL
*Acting Director of the United States Patent and Trademark Office*